T. A. BURGESS.
BEAN CUTTER AND WINDROWER.
APPLICATION FILED MAY 29, 1918.
1,288,499.
Patented Dec. 24, 1918.
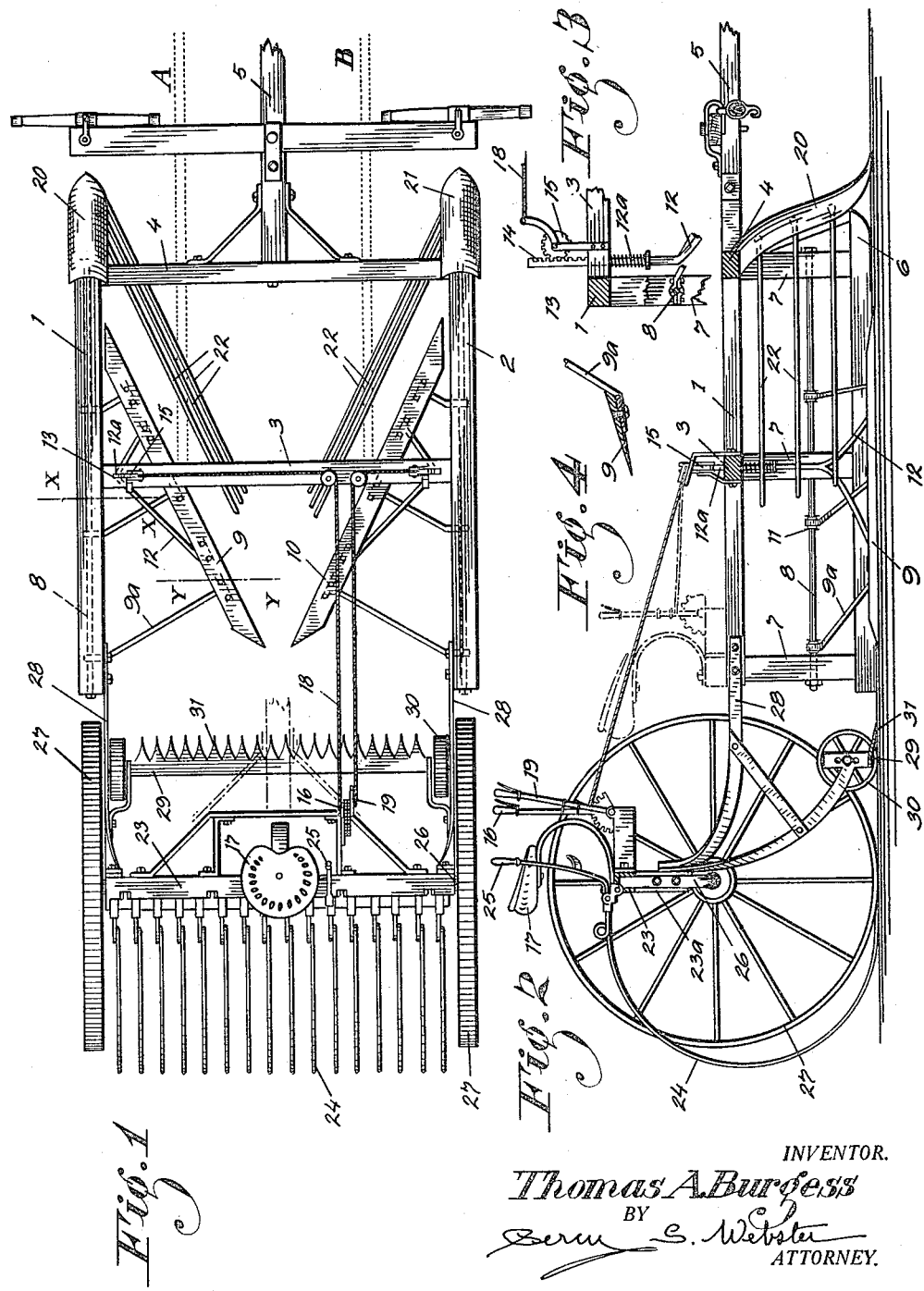
INVENTOR.
Thomas A. Burgess
BY
S. Webster
ATTORNEY.

UNITED STATES PATENT OFFICE.

THOMAS A. BURGESS, OF MODESTO, CALIFORNIA.

BEAN CUTTER AND WINDROWER.

1,288,499. Specification of Letters Patent. Patented Dec. 24, 1918.

Application filed May 29, 1918. Serial No. 237,279.

*To all whom it may concern:*

Be it known that I, THOMAS A. BURGESS, a citizen of the United States, residing at Modesto, in the county of Stanislaus and State of California, have invented certain new and useful Improvements in Bean Cutters and Windrowers; and I do declare the following to be a clear, full, and exact description of the same, reference being had to the accompanying drawings, and to the characters of reference marked thereon, which form a part of this application.

This invention relates to improvements in implements for the harvesting of beans. The object of the invention is to produce such a cutter as will easily move between the rows of beans, cut the same, and pile them in windrows ready for shucking and threshing.

The method now in use is wasteful and expensive, for it requires a great deal of manual labor to prepare the windrows for the threshing, and this loss I aim to overcome by my improved cutter and windrower.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of the complete device, the tongue being broken off.

Fig. 2 is a similar view showing a side elevation of the device, partly broken out and in section.

Fig. 3 is a sectional view taken on a line X—X of Fig. 1.

Fig. 4 is a sectional view taken on a line Y—Y of Fig. 1.

Referring now more particularly to the characters of reference on the drawings, the numerals 1 and 2 designate the main supporting frames which are fastened together by suitable cross pieces 3 and 4.

The numeral 5 designates the tongue, which can be easily removed and replaced by the necessary draw-bar should a tractor be used instead of horses as the draft means. The frames 1 and 2 are mounted on runners 6 and rigidly held together by upright members 7 and rods 8.

Two horizontal cutting blades 9 and 10, positioned with their forward ends near the beams 1 and 2 and their rear ends spaced slightly from each other central of the device, are pivotally mounted on the rods 8 in the following manner: Braces $9^a$ are turnably mounted on the rods 8 at spaced intervals, their position thereon being maintained by cotter pins 11 or other common means. These braces extend under the blades 9 and 10 to which they are so bolted as to be sufficiently loose to permit the slight elevation of the blades without binding.

In order to keep the blades at the desired depth while the cutter is moving along the rows, I provide a means for raising or lowering the same, this means including a forked rod 12, the forked ends of which are loosely bolted on the underside of the blade 9. The vertical part $12^a$ of this forked rod 12 passes through an opening 13 in the member 3 and is provided with a plurality of rack teeth 14 meshing with a corresponding pinion 15. This pinion 15 is operated by a lever 16 to the right of the driver's seat 17 through the medium of a small cable 18, which is attached at one end to the lever 16 and at the other end to an arm secured to and projecting upwardly from the shaft of the pinion 15, as shown in Fig. 3 or any other suitable connection. It would very often happen that owing to the unevenness of the ground, the runners 6 would be on a slightly lower level than the blades 9 and 10. If the position of these blades was fixed, the blades would be cutting through dirt before cutting the roots, which would very quickly dullen and ruin the cutting edges. With my lever-operated adjustable blades, however, I am enabled to raise the blades for a short distance when it is desired and thus keep them free of the dirt. Any tendency of the blades to bind when so raised owing to their angular setting with regards to their pivotal points is taken care of by the loose mounting of the braces. A similar device connects the blade 10 to the operating lever 19 also situated at a convenient point from the driver's seat 17.

My improved bean cutter and windrower is designed to take two rows, represented on the drawing by the double dotted lines A and B. It will be seen that the horses are traveling between the next outside rows and will not tramp over the crop. However, should there be a few interwoven vines, they will be separated by the dividing members 20 and 21 in front of the frames 1 and 2. As the cutter moves along, the vines are guided toward the center and the rear by the horizontal rods 22, while their roots are severed by the blades 9 and 10. This operation leaves the vines absolutely free and in perfect condition to be picked by the windrowing attachment which is used in connection with the cutter. This windrowing attachment is composed of a beam 23 supporting the seat 17, the levers 16 and 19, a plurality of hinged curved teeth 24 and a lever 25 to operate said curved teeth. The ends of the beam 23 are bent downwardly, as at 23ª, and adapted to receive the vertical part of the bent axles 26 on which are mounted the wheels 27.

The cutter and windrower are connected by the braces 28 which are bolted on each member. To give the windrowing attachment more stability and efficiency, I have an auxiliary frame 29 supported on wheels 30 and provided with pointed guards 31, their purpose being to separate the dirt from the vines and prepare them to be properly windrowed.

In practice, when there is a sufficient amount of bean vines gathered under the beam 23, the driver throws the lever 25 forward. This operation raises the teeth 24 and the vines are released. The lever 25 is then brought back to its former position until the next dumping place is reached, and the same operation is repeated. Thus, the beans are cut and put in heavy windrows in one operation. If, however, it is desired to use the cutter separately, the seat 17, levers 16 and 19 can be transferred from the windrowing attachment to the cutter, as shown by the dotted lines in Fig. 2. Also, a tongue can be attached to the windrowing device as shown by dotted lines in Fig. 1, should this latter device be used separately. The lever 25 is designed to be used either by hand or foot.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A bean cutter comprising a pair of runners spaced apart, upright members thereon supporting a horizontal frame, horizontal rods disposed along the upright members, a plurality of braces turnably mounted on each of said rods, a horizontal cutting blade mounted to the braces on each rod, said blades being arranged in V relation to each other, and a manually operated means whereby the blades may each be raised or lowered independent of the other.

2. A bean cutter and windrower comprising in combination a pair of runners, upright members thereon connected to and supporting a horizontal frame, rods parallel to the runners and connecting said upright members, a plurality of braces turnably mounted on said rods, and horizontal cutting blades loosely bolted to the lower end of the braces, said blades forming a V whose apex is at the rear end thereof.

3. In a bean cutter and windrower of the character described, a pair of runners, said runners having upright members supporting a horizontal frame, rods connecting said upright members, a plurality of braces, the upper end of said braces being turnably mounted on said rods, means to keep said braces from sliding movement, cutting blades arranged in V-relation to each other, said blades being fastened to the lower ends of said braces, and means to raise and lower said blades.

4. A bean cutter and windrower comprising a runner supported horizontal frame, a vine separating member depending downwardly from the forward end of the frame on each side thereof, a plurality of rods extending rearwardly from each of the separating members and converging toward the center, a horizontal cutter blade mounted on each side of the frame to the rear of said rods and parallel thereto, and a guard member having a plurality of pointed teeth mounted transversely of the frame to the rear of the cutter blade, and adjacent the ground, whereby the dirt is separated from the roots of the vines after being cut.

In testimony whereof I affix my signature in presence of two witnesses.

THOMAS A. BURGESS.

Witnesses:
 VERADINE WARNER,
 BERNARD PRIVAT.

Copies of this patent may be obtained for five cents each, by addressing the "Commissioner of Patents, Washington, D. C."